(12) United States Patent
Tang et al.

(10) Patent No.: US 11,578,385 B2
(45) Date of Patent: Feb. 14, 2023

(54) DEVICE FOR CONTINUOUSLY DECOMPOSING RARE EARTH CONCENTRATE ORE

(71) Applicant: CHINA ENFI ENGINEERING CORPORATION, Beijing (CN)

(72) Inventors: Jianwen Tang, Beijing (CN); Guoshan Du, Beijing (CN); Pengfei Xian, Beijing (CN); Shuang Qiu, Beijing (CN); Wenlong Zhou, Beijing (CN); Bo Qin, Beijing (CN)

(73) Assignee: CHINA ENFI ENGINEERING CORPORATION, Beijing (CN)

( * ) Notice: Subject to any disclaimer, the term of this patent is extended or adjusted under 35 U.S.C. 154(b) by 573 days.

(21) Appl. No.: 16/664,145

(22) Filed: Oct. 25, 2019

(65) Prior Publication Data

US 2020/0056261 A1    Feb. 20, 2020

Related U.S. Application Data

(63) Continuation of application No. PCT/CN2018/095292, filed on Jul. 11, 2018.

(30) Foreign Application Priority Data

Jul. 17, 2017    (CN) .......................... 201710581580.1

(51) Int. Cl.
*C22B 3/02*    (2006.01)
*C22B 3/08*    (2006.01)
(Continued)

(52) U.S. Cl.
CPC ................ *C22B 3/02* (2013.01); *B01F 29/84* (2022.01); *B01F 35/71* (2022.01); *C22B 3/08* (2013.01); *C22B 59/00* (2013.01)

(58) Field of Classification Search
CPC .......... B01F 27/60; B01F 27/62; B01F 27/71; B01F 27/72; B01F 27/724; B01F 27/721;
(Continued)

(56) References Cited

U.S. PATENT DOCUMENTS 3,269,708 A * 8/1966 Leister .................. B01F 27/723
                                                          366/300
3,529,938 A * 9/1970 Melson ................ B01D 9/0013
                                                           62/545
4,483,625 A * 11/1984 Fisher ..................... B01F 27/62
                                                          366/196

FOREIGN PATENT DOCUMENTS

CN        201039735 Y  *  3/2008
DE    102004014163 A1 * 12/2004   .......... B01F 15/0235
(Continued)

OTHER PUBLICATIONS

Spray Nozzles, Feb. 2014, John Brooks Company Limited, p. 43-44 (Year: 2014).*
WIPO, ISR for PCT/CN2018/095292, Oct. 11, 2018.

*Primary Examiner* — Vanessa T. Luk
*Assistant Examiner* — Nikolas Takuya Pullen
(74) *Attorney, Agent, or Firm* — Hodgson Russ LLP

(57) ABSTRACT

Provided is a device for continuously decomposing a rare earth concentrate ore. The device includes a body, a bidirectional propeller and a driving assembly. The body has a material inlet, two liquid inlets and two exhaust gas outlets disposed at the top of the body, two material outlets disposed at the bottom of the body and a heat preservation chamber provided inside a side wall of the body. The bidirectional propeller is provided in the body and extends along a length direction of the body. The driving assembly is connected to the rotating shaft.

13 Claims, 1 Drawing Sheet

(51) Int. Cl.
*C22B 59/00* (2006.01)
*B01F 29/84* (2022.01)
*B01F 35/71* (2022.01)

(58) Field of Classification Search
CPC .. B01F 27/722; B01F 27/7221; B01F 27/723;
B01F 27/726; B01F 27/73; B01F 27/731;
C22B 3/02; C22B 59/00
See application file for complete search history.

(56) References Cited

FOREIGN PATENT DOCUMENTS

| KR | 200441504 Y1 | * | 8/2008 | |
|---|---|---|---|---|
| KR | 100894215 B1 | * | 4/2009 | |
| KR | 20130100477 A | * | 9/2013 | |
| WO | WO-9604220 A1 | * | 2/1996 | .............. B01F 7/081 |

\* cited by examiner

DEVICE FOR CONTINUOUSLY DECOMPOSING RARE EARTH CONCENTRATE ORE

CROSS-REFERENCE TO RELATED APPLICATION

This application is a continuation of International Application PCT/CN2018/095292, filed Jul. 11, 2018, which claims priority to Chinese Patent Application No. 201710581580.1, filed Jul. 17, 2017. The entire disclosures of the aforementioned applications are incorporated herein by reference.

FIELD

The present disclosure relates to the field of metallurgical technology, in particular to a device for continuously decomposing a rare earth concentrate ore.

BACKGROUND

Baotou mixed ore (a mixed ore of bastnaesite and monazite) and bastnasite ore are important resources of rare earth ores in China. In view of the characteristics of Baotou mixed ore, an existing industrial method for processing such an ore is a calcination process with concentrated sulfuric acid. The process is continuous and controllable, which can be applied in large scale production. However, during the process, the mixed ore is decomposed at a high temperature, and thorium in the ore is converted into thorium pyrophosphate in the slag, resulting in radioactive pollution and waste of thorium. Moreover, it is difficult to recycle exhaust gas containing fluorine and sulfur of this process. In view of characteristics of the bastnasite ore, an existing industrial method is an acidolysis process such as an oxidation calcining-hydrochloric acid dissolving process. Such a process is less expensive but cannot be performed in a continuous manner. Further, thorium and fluorine in slag and wastewater, respectively, are difficult to be recycled, resulting in pollution to the environment.

Therefore, the existing means for processing the rare earth concentrate ore needs to be further improved.

SUMMARY

The present disclosure provides in embodiments a device for continuously decomposing a rare earth concentrate ore, including:
  a body having a material inlet, two liquid inlets and two exhaust gas outlets disposed at the top of the body, two material outlets disposed at the bottom of the body and a heat preservation chamber provided inside a side wall of the body, in which
    the material inlet is located in the middle of the top of the body,
    one of the two liquid inlets is located at a first side of the material inlet and the other one of the two liquid inlets is located at a second side of the material inlet,
    one of the two exhaust gas outlets is located at the first side of the material inlet and the other one of the two exhaust gas outlets is located at the second side of the material inlet,
    one of the two material outlets is adjacent to a first end of the body and the other one of the two material outlets is adjacent to a second end of the body, and
    the heat preservation chamber has a heat preservation liquid inlet and a heat preservation liquid outlet;
  a bidirectional propeller provided in the body and extending along a length direction of the body, including:
    a rotating shaft including a first shaft section and a second shaft section,
    a first spiral blade disposed on the first shaft section of the rotating shaft, and
    a second spiral blade disposed on the second shaft section of the rotating shaft, in which a spiral direction of the first spiral blade is opposite to that of the second spiral blade, such that the first spiral blade discharges materials toward a first end of the rotating shaft and the second spiral blade discharges materials toward a second end of the rotating shaft; and a driving assembly connected to the rotating shaft.

In some embodiments of the present disclosure, with respect to the material inlet, the two liquid inlets are arranged opposite to each other along the length direction of the body and the two exhaust gas outlets are arranged opposite to each other along the length direction of the body.

In some embodiments of the present disclosure, the liquid inlet is located between the material inlet and the exhaust gas outlet, and is closer to the material inlet than the exhaust gas outlet.

In some embodiments of the present disclosure, the device further includes: two liquid spraying pipes, each of which is horizontally disposed at an upper portion in the body, connected to the liquid inlet, and provided with a plurality of liquid spraying holes.

In some embodiments of the present disclosure, the liquid spraying pipe is arranged along a width direction of the body.

In some embodiments of the present disclosure, the plurality of liquid spraying holes are distributed at a lower portion of the liquid spraying pipe.

In some embodiments of the present disclosure, two bidirectional propellers are arranged in parallel.

In some embodiments of the present disclosure, the driving assembly includes: a gear connected to the rotating shaft of the bidirectional propeller, a speed reducer connected to the gear via a coupling, and a motor connected to the speed reducer.

In some embodiments of the present disclosure, the device further includes: a plurality of temperature measuring members disposed at the side wall of the body.

In some embodiments of the present disclosure, the plurality of temperature measuring members are equally spaced apart at two side walls along the length direction of the body.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
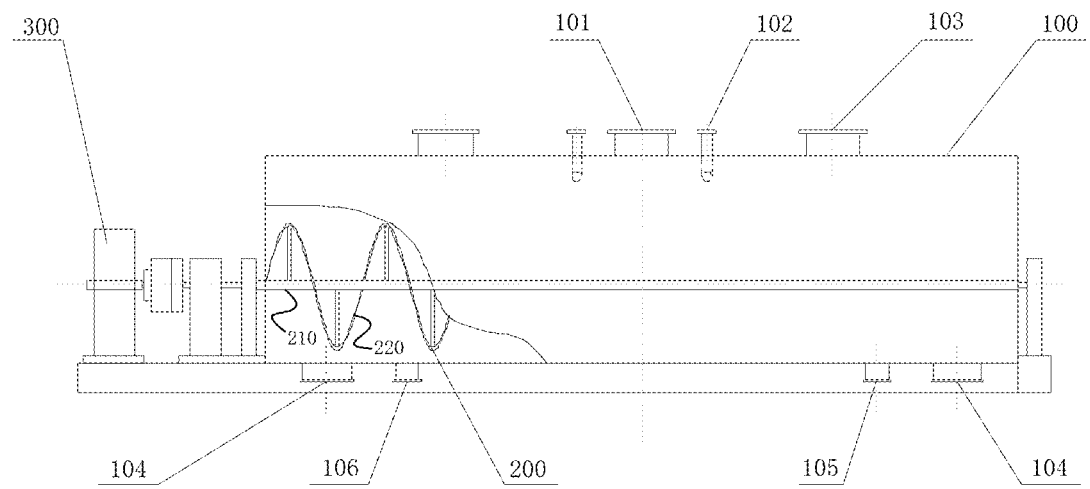
FIG. 1 is a schematic diagram illustrating a device for continuously decomposing a rare earth concentrate ore according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description, it is to be understood that terms such as "central", "longitudinal", "lateral", "length", "width", "upper", "lower", "front", "rear", "left", "right", "vertical", "horizontal", "top", "bottom", "inner", "outer", "axial direction", "radial direction" and "circumferential direction" should be construed to refer to the orientation as then described or as shown in the drawings under discussion. These relative terms are for convenience of description and do not require that the present invention be constructed or operated in a particular orientation, and thus shall not be construed to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may include one or more this feature. In the description of the present disclosure, "a plurality of" means two or more than two this features, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

The present disclosure has been made based on the discovery of the following problems and facts by the inventors.

The inventors made researches on the method for processing the rare earth concentrate ore and found that research institutes have proposed to use a low-temperature calcination technology with concentrated sulfuric acid to decompose the rare earth ores. The rare earth concentrate ore can be calcined at a low temperature (in a range of 150 to 300° C.) and the decomposition rate of rare earth is more than 95%. At the same time, more than 90% of thorium exists in the leachate, and thus element thorium can be effectively recovered from the rare earth concentrate ore. However, as the rare earth concentrate ore is reacted with the concentrated sulfuric acid, the materials are changed from slurry to a semi-dry state, further to form cake-like materials, resulting in difficulty in continuous dynamic production, and thus such a process technology has not been widely used in production.

In view of this, the present disclosure provides a device for continuously decomposing a rare earth concentrate ore. With such a device, the rare earth concentrate ore is efficiently and continuously decomposed, so as to ensure continuous operation of production and significantly increase the decomposition rate of rare earth concentrate ore.

The present disclosure provides in embodiments a device for continuously decomposing a rare earth concentrate ore, including a body, a bidirectional propeller and a driving assembly. The body has a material inlet, two liquid inlets and two exhaust gas outlets disposed at the top of the body, two material outlets disposed at the bottom of the body and a heat preservation chamber provided inside a side wall of the body. Specifically, the material inlet is located in the middle of the top of the body, one of the two liquid inlets is located at a first side of the material inlet and the other one of the two liquid inlets is located at a second side of the material inlet, one of the two exhaust gas outlets is located at the first side of the material inlet and the other one of the two exhaust gas outlets is located at the second side of the material inlet, one of the two material outlets is adjacent to a first end of the body and the other one of the two material outlets is adjacent to a second end of the body, and the heat preservation chamber has a heat preservation liquid inlet and a heat preservation liquid outlet. The bidirectional propeller is provided in the body and extends along a length direction of the body. The bidirectional propeller includes: a rotating shaft including a first shaft section and a second shaft section, a first spiral blade disposed on the first shaft section of the rotating shaft, and a second spiral blade disposed on the second shaft section of the rotating shaft. Specifically, a spiral direction of the first spiral blade is opposite to that of the second spiral blade, such that the first spiral blade discharges materials toward a first end of the rotating shaft and the second spiral blade discharges materials toward a second end of the rotating shaft. The driving assembly is connected to the rotating shaft.

With the device for continuously decomposing the rare earth concentrate ore according to embodiments of the present disclosure, after the rate earth concentrate ore is fully mixed with the concentrated sulfuric acid, a mixture is formed and fed into the device via the material inlet, and is driven by the bidirectional propeller to move toward the two ends of the device. At the same time, industrial water or dilute acid is sprayed to the mixture through the liquid inlets to dilute the concentrated sulfuric acid, such that a large amount of heat and steam are generated, thus improving decomposition efficiency of the rare earth concentrate ore. On the other hand, temperature of the reaction system may be kept by passing heat transfer oil or steam through the heat preservation chamber. Further, driven by the bidirectional propeller, the mixture is converted into a loose porous solid, thus further increasing the decomposition rate of the rare earth concentrate ore in the mixture. Finally, the rare earth concentrate ore is completely decomposed with the acid and is discharged via the material outlet, and the exhaust gas generated during the decomposition process is discharged via the exhaust gas outlet and is further processed. Therefore, with such a device, the rare earth concentrate ore is efficiently and continuously decomposed, so as to ensure continuous operation of production and significantly improve the decomposition rate of rare earth concentrate ore.

Figure 2:
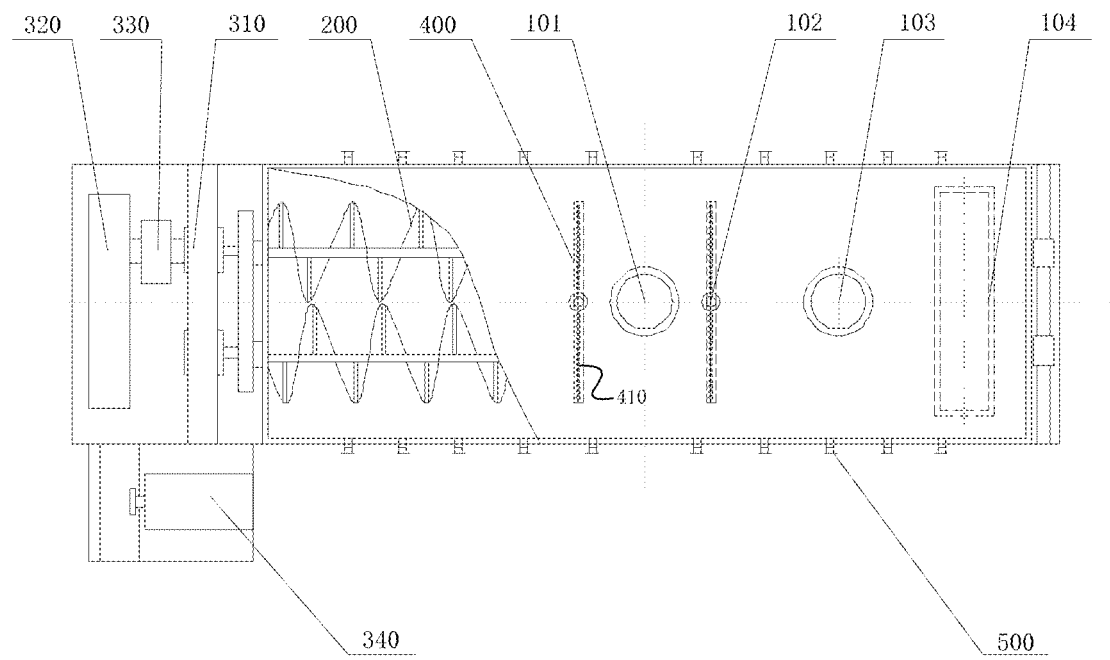
FIG. 2 is a schematic diagram illustrating a device for continuously decomposing a rare earth concentrate ore according to another embodiment of the present disclosure.

With references to FIGS. 1 and 2, the device for continuously decomposing the rare earth concentrate ore according to embodiments of the present disclosure is described in details as follows.

The present disclosure provides in embodiments a device for continuously decomposing a rare earth concentrate ore including a body 100, a bidirectional propeller 200 and a driving assembly 300.

In an embodiment of the present disclosure, the body 100 has a material inlet 101, two liquid inlets 102 and two exhaust gas outlets 103 disposed at the top of the body 100. The material inlet 101 is located in the middle of the top of the body 100. One of the two liquid inlets 102 is located at a first side of the material inlet 101 and the other one of the two liquid inlets 102 is located at a second side of the material inlet 101. One of the two exhaust gas outlets 103 is located at the first side of the material inlet 101 and the other one of the two exhaust gas outlets 103 is located at the second side of the material inlet 101. The body 100 has two material outlets 104 disposed at the bottom of the body 100, and one of the two material outlets 104 is adjacent to a first end of the body 100 and the other one of the two material outlets 104 is adjacent to a second end of the body 100. Therefore, after the rate earth concentrate ore is fully mixed with the concentrated sulfuric acid, a mixture is formed and fed into the body 100 of the device via the material inlet 101, and is driven by the bidirectional propeller 200 to move toward the two ends of the device along the length direction of the body 100. At the same time, industrial water or dilute acid is sprayed to the mixture through the liquid inlets 102, such that the concentrated sulfuric acid is diluted to release heat to accelerate the acid decomposition reaction, and thus the rare earth concentrate ore can be completed decomposed during the movements of the mixture toward to the two ends of the device. The mixture is discharged out of the device via the two material outlets 104 disposed at the bottom of the body 100, and the exhaust gas generated by the reaction is discharged out of the device via the exhaust gas outlets 103.

In a specific embodiment of the present disclosure, with respect to the material inlet 101, the two liquid inlets 102 are arranged opposite to each other along the length direction of the body 100 and the two exhaust gas outlets 103 are arranged opposite to each other along the length direction of the body 100.

In a specific embodiment of the present disclosure, the liquid inlet 102 is located between the material inlet 101 and the exhaust gas outlet 103, and is closer to the material inlet 101 than the exhaust gas outlet 103.

In an embodiment of the present disclosure, a heat preservation chamber (not shown in figures) is provided inside a side wall of the body 100, having a heat preservation liquid inlet 105 and a heat preservation liquid outlet 106. Therefore, the mixture in the body 100 may be kept warm or heated by supplying heat transfer oil or hot steam to the heat preservation chamber, thus further improving efficiency of the decomposition reaction of the rare earth concentrate ore.

In an embodiment of the present disclosure, the bidirectional propeller 200 is provided in the body 100 and extends along a length direction of the body 100. The bidirectional propeller 200 includes a rotating shaft 210, a first spiral blade 220 and a second spiral blade (not shown in figures). The rotating shaft 210 includes a first shaft section (not shown in figures) and a second shaft section (not shown in figures). The first spiral blade 220 is disposed on the first shaft section of the rotating shaft 210, and the second spiral blade is disposed on the second shaft section of the rotating shaft 210. A spiral direction of the first spiral blade is opposite to that of the second spiral blade, such that the first spiral blade discharges materials toward a first end of the rotating shaft and the second spiral blade discharges materials toward a second end of the rotating shaft. Therefore, the mixture added from the material inlet 101 may be moved to either end of the body, thus further improving the efficiency of the decomposition reaction of the rare earth concentrate ore.

In a specific embodiment of the present disclosure, there are two bidirectional propellers 200 which are arranged in parallel. Therefore, the efficiency of the decomposition reaction of the rare earth concentrate ore may be further improved.

In an embodiment of the present disclosure, the driving assembly 300 is connected to the rotating shaft 210, so as to drive the bidirectional propeller 200 to rotate.

In a specific embodiment of the present disclosure, the driving assembly 300 includes a gear 310, a speed reducer 320, a coupling 330 and a motor 340. The gear 310 is connected to rotating shafts 210 of the two bidirectional propellers 200. The speed reducer 320 is connected to the gear 310 via the coupling 330. The motor 340 is connected to the speed reducer 320.

In an embodiment of the present disclosure, the device for continuously decomposing the rare earth concentrate ore as described above further includes two liquid spraying pipes 400. Each of the pipes 400 is horizontally disposed at an upper portion in the body 100, connected to the liquid inlet 102, and provided with a plurality of liquid spraying holes 410. On this basis, the industrial water or dilute acid added from the liquid inlet can be sprayed towards the interior of the body chamber via the liquid spraying pipe, thus further improving the efficiency of the decomposition reaction of the rare earth concentrate ore.

In a specific embodiment of the present disclosure, the liquid spraying pipe 400 is arranged along a width direction of the body 100, thus further improving the efficiency of the decomposition reaction of the rare earth concentrate ore.

In a specific embodiment of the present disclosure, the plurality of liquid spraying holes 410 are distributed at a lower portion of the liquid spraying pipe 400.

In an embodiment of the present disclosure, the device for continuously decomposing the rare earth concentrate ore as described above further includes a plurality of temperature measuring members 500 disposed at the side wall of the body 100. Therefore, temperatures of the heat preservation chamber and inside the body can be detected by the temperature measuring members 500.

In a specific embodiment of the present disclosure, the plurality of temperature measuring members 500 are equally spaced apart at two side walls along the length direction of the body 100.

In an embodiment of the present disclosure, in the body, four virtual regions, i.e., a contacting region, an aging region, a calcining region and a crushing region, are defined from the material inlet to the material outlet. The mixture may be in contact with the industrial water or dilute acid in the contacting region, in which the concentrated sulfuric acid is diluted to generate a large amount of heat and steam, and the released heat can accelerate the decomposition reaction of the rare earth concentrate ore with the concentrated sulfuric acid, such that the mixture expands from a slurry to a semi-dry material. Driven by the bidirectional propeller, the semi-dry material enters the aging region. Further, the heat transfer oil or hot steam is added to the heat preservation chamber through the heat preservation liquid inlet, such that the temperature of the corresponding region in the body is increased to a range of 130 to 210° C. (the temperature can be measured by the temperature measuring members and then automatically adjusted), thus accelerating the aging reaction of the rare earth concentrate ore with the concentrated sulfuric acid. After the aging reaction, the semi-dry material is transformed into a porous dry material, and the dry material is changed from block to power and enters the calcining region due to the shearing action of the bidirectional propeller. At the same time, the temperature is adjusted to a range of 250 to 280° C., such that the powder material can be further decomposed. Under the repeated agitation of the bidirectional propeller, the powder material can be uniformly heated and thus a time period for the reaction can be shortened. With the movement of the materials, the solid material is formed to have a loose and porous structure, thus further increasing acidolysis rate of the rare earth concentrate ore. At the end, the obtained acidolysis product is discharged from the material outlet, and the exhaust gas generated in the reaction is discharged from the exhaust gas outlet and used to recover valuable fluorine. Therefore, with the present device for continuously decomposing the rare earth concentrate ore, mixing unevenness and local agglomeration can be avoided during the acidolysis process of the rare earth concentrate ore, so as to effectively utilize the heat generated by diluting the concentrated sulfuric acid and to continuously decompose the rare earth concentrate ore with the sulfuric acid, thus ensuring the continuous production.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A device for continuously decomposing a rare earth concentrate ore, comprising:
    a body having a material inlet, two liquid inlets and two exhaust gas outlets disposed at the top of the body, two material outlets disposed at the bottom of the body and a heat preservation chamber provided inside a side wall of the body, wherein:
        the material inlet is located in the middle of the top of the body, and is configured to receive the rare earth concentrate ore,
        one of the two liquid inlets is located at a first side of the material inlet and the other one of the two liquid inlets is located at a second side of the material inlet,
        one of the two exhaust gas outlets is located at the first side of the material inlet and the other one of the two exhaust gas outlets is located at the second side of the material inlet,
        one of the two material outlets is adjacent to a first end of the body and the other one of the two material outlets is adjacent to a second end of the body, each of the two material outlets is configured to discharge a decomposed ore, and
        the heat preservation chamber has a heat preservation liquid inlet and a heat preservation liquid outlet;
    a bidirectional propeller provided in the body and extending along a length direction of the body, comprising:
        a rotating shaft comprising a first shaft section and a second shaft section,
        a first spiral blade disposed on the first shaft section of the rotating shaft, and
        a second spiral blade disposed on the second shaft section of the rotating shaft, wherein a spiral direction of the first spiral blade is opposite to that of the second spiral blade, such that the first spiral blade discharges materials toward a first end of the rotating shaft and the second spiral blade discharges materials toward a second end of the rotating shaft; and
    a driving assembly connected to the rotating shaft.

2. The device according to claim 1, wherein with respect to the material inlet, the two liquid inlets are arranged opposite to each other along the length direction of the body and the two exhaust gas outlets are arranged opposite to each other along the length direction of the body.

3. The device according to claim 1, wherein each of the two liquid inlets is located between the material inlet and one of the two exhaust gas outlets, and is closer to the material inlet than the respective one of the two exhaust gas outlets.

4. The device according to claim 1, further comprising:
    two liquid spraying pipes, each of which is horizontally disposed at an upper portion in the body, connected to one of the two liquid inlets, and provided with a plurality of liquid spraying holes.

5. The device according to claim 4, wherein each of the two liquid spraying pipes is arranged along a width direction of the body.

6. The device according to claim 5, wherein the plurality of liquid spraying holes are distributed at a lower portion of each of the two liquid spraying pipes.

7. The device according to claim 1, further comprising a second bidirectional propeller arranged in parallel with the bidirectional propeller.

8. The device according to claim 1, wherein the driving assembly comprises:
    a gear connected to the rotating shaft of the bidirectional propeller,
    a speed reducer connected to the gear via a coupling, and
    a motor connected to the speed reducer.

9. The device according to claim 1, further comprising:
    a plurality of temperature measuring members disposed at the side wall of the body.

10. The device according to claim 9, wherein the plurality of temperature measuring members are equally spaced apart at two side walls along the length direction of the body.

11. The device according to claim 1, wherein the material inlet is configured to receive a mixture of the rare earth concentrate ore and concentrated sulfuric acid, and each of the two liquid inlets is configured to spray industrial water or dilute acid to the mixture.

12. The device according to claim 1, wherein a contacting region, an aging region, a calcining region and a crushing region are defined in the body from the material inlet to the material outlet,

- wherein in the contacting region, a mixture of the rare earth concentrate ore and concentrated sulfuric acid received from the material inlet is mixed with industrial water or dilute acid received from each of the two liquid inlets, the concentrated sulfuric acid is diluted by the industrial water or dilute acid to release heat for decomposition of the rare earth concentrate ore, and a semi-dry material is obtained,
- the aging region has a temperature in a range of 130 to 210° C. for converting the semi-dry material to a porous dry material,
- the calcining region has a temperature in a range of 250 to 280° C. for further decomposition of the rare earth concentrate ore, and
- the material from the calcining region is crushed in the crushing region.

13. The device according to claim 1, wherein a heat transfer oil or hot steam is added to the heat preservation chamber through the heat preservation liquid inlet.

* * * * *